United States Patent
Crosson et al.

(10) Patent No.: US 11,828,705 B2
(45) Date of Patent: Nov. 28, 2023

(54) APPARATUS AND METHOD FOR SPECTROSCOPICALLY DETECTING A SAMPLE

(71) Applicant: Sparrow Detect, Inc., Pleasanton, CA (US)

(72) Inventors: Eric R. Crosson, Livermore, CA (US); David A. Fisher, Menlo Park, CA (US)

(73) Assignee: Sparrow Detect, Inc., Pleasanton, CA (US)

(*) Notice: Subject to any disclaimer, the term of this patent is extended or adjusted under 35 U.S.C. 154(b) by 0 days.

(21) Appl. No.: 17/709,860

(22) Filed: Mar. 31, 2022

(65) Prior Publication Data

US 2023/0314318 A1    Oct. 5, 2023

(51) Int. Cl.
| | | |
|---|---|---|
| *G01N 21/39* | (2006.01) | |
| *G01J 3/433* | (2006.01) | |
| *G01J 3/42* | (2006.01) | |
| *G01N 21/31* | (2006.01) | |

(52) U.S. Cl.
CPC ............ *G01N 21/39* (2013.01); *G01J 3/4338* (2013.01); *G01J 2003/423* (2013.01); *G01N 2021/3148* (2013.01)

(58) Field of Classification Search
CPC ............ G01N 21/39; G01N 2021/3148; G01J 3/4338; G01J 2003/423
USPC ......................................................... 356/307
See application file for complete search history.

(56) References Cited

U.S. PATENT DOCUMENTS

| | | |
|---|---|---|
| 3,728,540 A | 4/1973 | Todd et al. |
| 3,732,017 A | 5/1973 | Wolber |
| 4,027,972 A | 6/1977 | Davies |
| 4,937,448 A | 6/1990 | Mantz et al. |
| 2008/0304066 A1 | 12/2008 | Kluczynski et al. |
| 2015/0308893 A1 | 10/2015 | Walters |
| 2017/0017075 A1* | 1/2017 | Reddy ................... G02B 26/10 |
| 2018/0340886 A1* | 11/2018 | Sezginer ................ G01N 21/55 |
| 2019/0086329 A1* | 3/2019 | Crosson ................... H01S 5/146 |
| 2021/0247299 A1 | 8/2021 | Crosson et al. |

OTHER PUBLICATIONS

PCT International Search Report PCT/US23/64481, dated Jun. 23, 2023.

\* cited by examiner

*Primary Examiner* — Md M Rahman
(74) *Attorney, Agent, or Firm* — Brian R. Short

(57) ABSTRACT

Apparatuses, methods, and systems for detecting a sample are disclosed. One method includes generating, by a tunable light source, a beam of electro-magnetic radiation, wherein a wavelength of the beam of electro-magnetic radiation is tuned to operate at a plurality of wavelengths. At least a portion of the beam of electro-magnetic radiation is directed to pass through the sample and a reference substance. The system detector is configured to sense at least the portion of the beam of electro-magnetic radiation after passing through the sample and the reference substance. The processor operates to receive information related to intensity or amplitude of the sensed beam of electro-magnetic radiation after passing through the sample and the reference substance and detect an amount of the sample based on the received information related to the intensity or amplitude of the sensed beam of the electro-magnetic radiation.

16 Claims, 9 Drawing Sheets

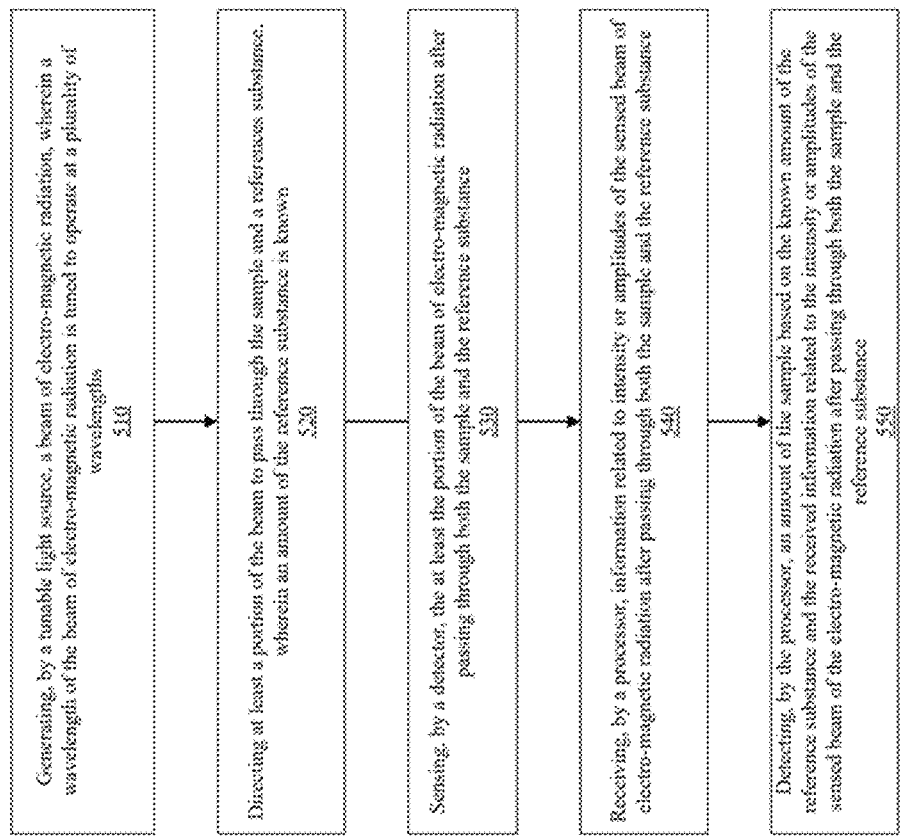

APPARATUS AND METHOD FOR SPECTROSCOPICALLY DETECTING A SAMPLE

FIELD OF THE DESCRIBED EMBODIMENTS

The described embodiments relate generally to gas detection. More particularly, the described embodiments relate to systems, methods, and apparatuses for spectroscopically detecting a sample.

BACKGROUND

There are many applications and markets today where much effort is being invested to develop sensor technologies that have greater performance in terms of sensitivity (parts per million or billion) and specificity (unambiguously detecting identified molecules) while offering the economics needed to deploy in a large scale to provide both qualitative and quantitative data to improve safety, their infrastructure and to better the environment. One example of such a need is around natural gas sensing (methane), a common energy source around the world. In the United States there are over 68 million homes and over 6 million buildings and thousands of factories that rely on natural gas. This gas is delivered via over 2.4 million miles of main gas pipelines having distributing pipes extending to homes/buildings and factories. This is a common means of distributing energy in major cities around the world. As with any infrastructure, the pipes continue to age and are prone to hazardous leaks. Natural gas is a highly combustible odorless and colorless hydrocarbon gas largely composed of methane. Gas leaks present a serious safety and environment hazard and much effort has been invested in developing higher sensitivity and specificity sensors. The need to deploy sensors extending to residential homes and buildings has placed price/performance criteria on sensors that are not currently satisfied by existing technologies. The primary performance concerns with existing commercial sensors are that they do not have specificity and hence generate false positives to common household agents; level of detection is not sufficient and the range of sensing is limited.

The Oil and Gas industry also utilize a wide variety of gases that present safety and environmental issues if not widely monitored for leaks. In the United State, Leak Detection and Repair (LDAR) programs are required as part of the Federal Regulations. A LDAR program is a facility's system of procedures used to locate and repair leaking components (e.g., valves, pumps, connectors, compressors, and agitators) to minimize fugitive Volatile Organic Compounds (VOC) and Hazardous Air Pollutants (HAP) emissions including but not limited to methane.

It is desirable to have methods apparatuses, and systems for spectroscopically detecting a sample.

SUMMARY

An embodiment includes a system for detecting a sample. The system includes a tunable light source, a sample, a reference substance, a sample detector, and a processor. The tunable light source operates to generate a beam of electro-magnetic radiation, wherein a wavelength of the beam of electro-magnetic radiation is tuned to operate at a plurality of wavelengths. At least a portion of the beam of electro-magnetic radiation is directed to pass through the sample and the reference substance. The system detector is configured to sense at least the portion of the beam of electro-magnetic radiation after passing through the sample and the reference substance. The processor operates to receive information related to intensity or amplitude of the sensed beam of electro-magnetic radiation after passing through the sample and the reference substance and detect an amount of the sample based on the received information related to the intensity or amplitude of the sensed beam of the electro-magnetic radiation after passing through both the sample and the reference substance.

Another embodiment includes a system for detecting a sample. The system includes a tunable light source, a sample, a reference substance, a system detector, and a processor. The tunable light source operates to generate a beam of electro-magnetic radiation, wherein a wavelength of the beam of electro-magnetic radiation is tuned to operate at a plurality of wavelengths. At least a portion of the beam of electro-magnetic radiation is directed to pass through the sample and the reference substance, wherein changes in the amount of the reference substance is known over time. The system detector is configured to sense at least the portion of the beam of electro-magnetic radiation after passing through the sample and the reference substance. The processor operates to receive information related to intensity or amplitude of the sensed beam of electro-magnetic radiation after passing through the sample and the reference substance and detect an amount of the sample based on the received information related to the intensity or amplitude of the sensed beam of the electro-magnetic radiation after passing through both the sample and the reference substance.

Another embodiment includes a method of detecting a sample. The method includes generating, by a tunable light source, a beam of electro-magnetic radiation, wherein a wavelength of the beam of electro-magnetic radiation is tuned to operate at a plurality of wavelengths, directing at least a portion of the beam to pass through the sample and a references substance, sensing, by a system detector, at least a portion of the beam of electro-magnetic radiation after passing through both the sample and the reference substance, receiving, by a processor, information related to intensity or amplitudes of the sensed beam of electro-magnetic radiation after passing through both the sample and the reference substance, and detecting, by the processor, an amount of the sample based on the received information related to the intensity or amplitudes of the sensed beam of the electro-magnetic radiation after passing through both the sample and the reference substance.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 5 is a flow chart that includes steps of a method for detecting an amount of a sample based on the received information related to the intensity or amplitude of a sensed beam of electro-magnetic radiation after passing through both the sample and a reference substance, according to an embodiment.

DETAILED DESCRIPTION

The embodiments described include methods, apparatuses, and systems for spectroscopically detecting a sample. For an embodiment, the sample is a gas.

Figure 1:
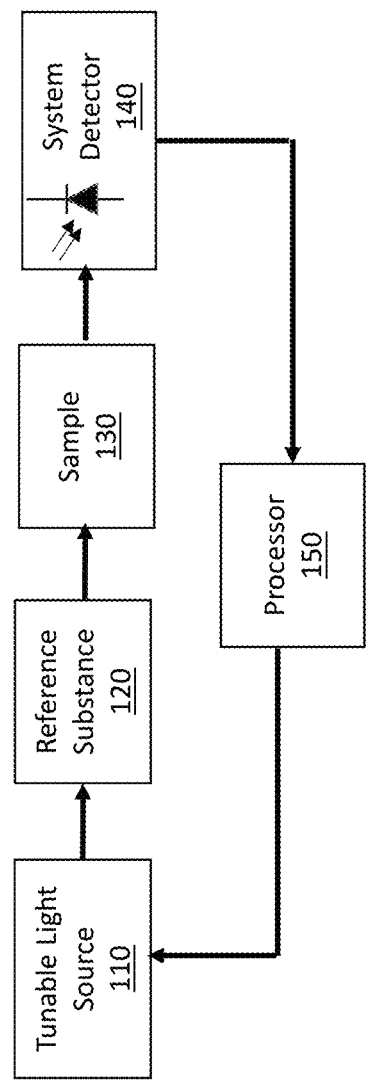
FIG. 1 is a block diagram of a system for detecting a sample, according to an embodiment.

FIG. 1 is a block diagram of a system for detecting a sample 130, according to an embodiment. For an embodiment, the sample 130 is a gas. As shown, this embodiment includes a tunable light source 110, a reference substance 120, a sample 130, a system detector 140, and a processor 150. For an embodiment, the tunable light source 110 generates a beam of electro-magnetic radiation, wherein a wavelength of the beam of electro-magnetic radiation is tuned to operate at a plurality of wavelengths.

For an embodiment, at least a portion of the beam of electro-magnetic radiation generated by a tunable light source passes through the reference substance 120 and the sample 130.

For an embodiment, the system detector 140 senses the electro-magnetic radiation after at least a portion of the electro-magnetic radiation has passed through the reference substance 120 and the sample 130.

For an embodiment, the processor receives information relating to the sensed electro-magnetic radiation, and detects the sample based on the intensity or amplitude of the sensed electro-magnetic radiation. For an embodiment, the processor 150 operates to record the received information relating to at least a portion of the sensed beam of electro-magnetic radiation after passing through both the sample 130 and the reference substance 120. The processor 150 operates to record the amount of the sample 130 based on the sensed portion of the beam of electro-magnetic radiation after passing through both the sample 130 and reference substance 120.

For an embodiment, the processor 150 further operates to tune the wavelength of the beam of electro-magnetic radiation based on monitoring electromagnetic radiation exiting from both the sample 130 and the reference substance 120, wherein the reference substance 120 is selected to ensure that a frequency of the electro-magnetic radiation corresponds to a frequency at which an absorption of the sample is measured. For an embodiment, this corresponds to a frequency at which electromagnetic radiation is absorbed by the sample and measured).

Figure 2:
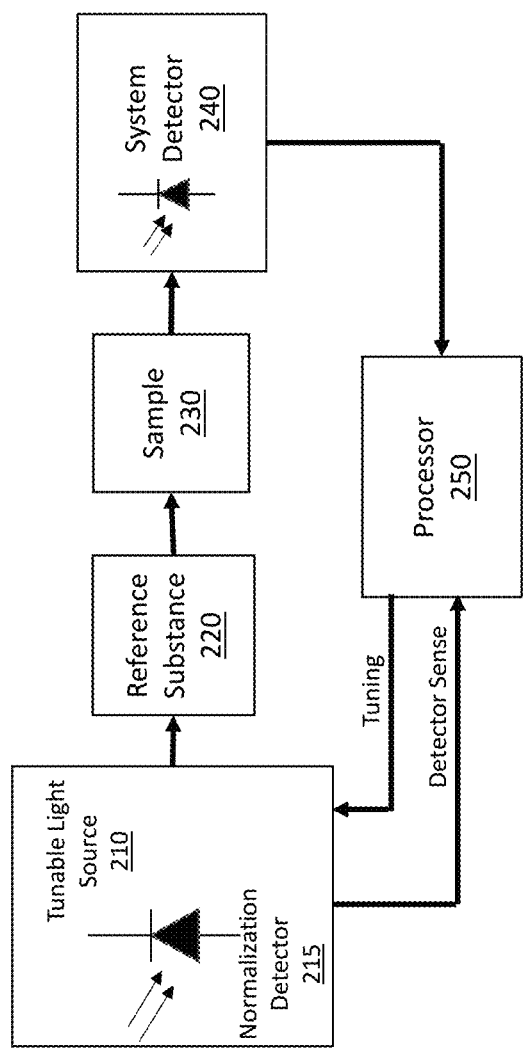
FIG. 2 is a block diagram of a system for detecting a sample that includes a normalization detector, according to an embodiment.

FIG. 2 is a block diagram of a system for detecting a sample that includes a normalization detector 215, according to an embodiment. For an embodiment, the normalization detector 215 operates to sense electro-magnetic radiation generated by the tunable light source 210.

For an embodiment, the processor 250 further operates to account for changes in intensity or amplitudes of the beam of electro-magnetic radiation having passed through the reference substance 220 and the sample 230 caused by changes in an intensity or amplitude of the electro-magnetic radiation being provided to pass through the reference substance 220 and the sample 230 by the tunable light source 210.

For an embodiment, the processor 250 further operates to monitor and record the sensed electro-magnetic radiation of the tunable light source 210 being provided to pass through the reference substance 220 and the sample 230. The processor 250 further operates to account for changes in intensity or amplitudes of the electro-magnetic radiation emanating from the tunable light source.

For an embodiment, detecting the amount of a sample is formulated using Beer-Lambert Law. The Beer-Lambert Law expresses the linear relationship between the absorbance of electro-magnetic radiation and the concentration of an absorbing species as electro-magnetic radiation travels through a sample. Beer's Law states that the absorption of electro-magnetic radiation in a sample is directly proportional to the concentration of the sample in which the electro-magnetic radiation travels. Lambert's Law states that the absorbance of electro-magnetic radiation in a homogeneous sample is directly proportional to the length of the sample in which the electro-magnetic radiation passes. Mathematically, the Beer-Lambert Law can be expressed as, $$A = \epsilon C x$$

wherein: A is the absorbance, $\epsilon$ is the molar extinction coefficient, C is the concentration of the sample, and x is the length of the path traveled by the electro-magnetic radiation through the sample.

Figure 3:
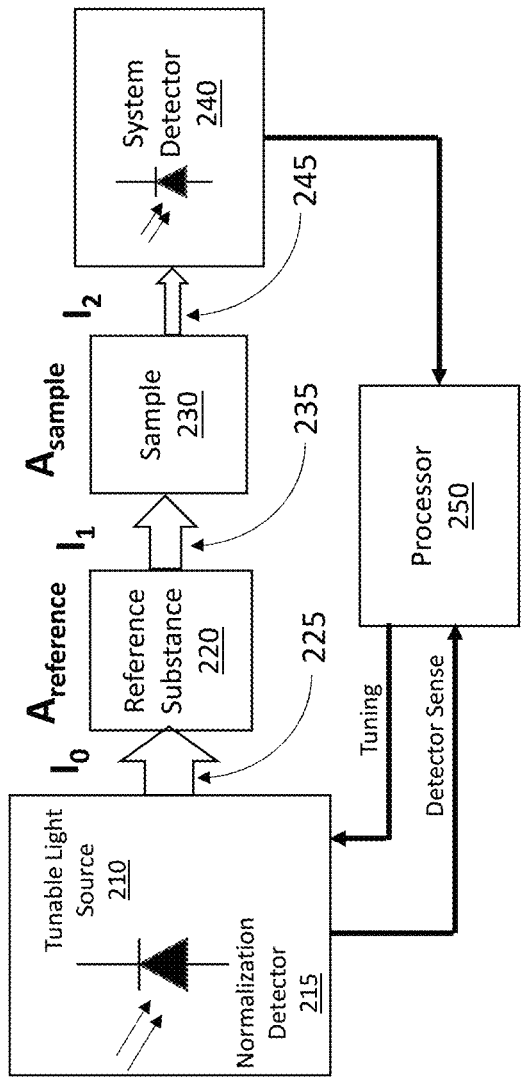
FIG. 3 is a block diagram of a system for detecting a sample that includes a normalization detector, and further depicts an intensity ($I_0$ and $I_1$) of electro-magnetic radiation entering and exiting a reference substance, according to an embodiment.

FIG. 3 is a block diagram of a system for detecting a sample that includes a normalization detector 215, and further depicts an intensity ($I_0$ and $I_1$) of electro-magnetic radiation entering and exiting a reference substance 220, according to an embodiment. The terms, $I_0$ and $I_1$ represent the intensity of the electro-magnetic radiation entering and exiting the reference substance, respectively. The terms, $I_1$ and $I_2$ represent the intensity of the electro-magnetic radiation entering and exiting the sample, respectively. For a representation, the width of the arrows 225, 235, 245 represents the intensity ($I_0$, $I_1$, $I_2$) of the electro-magnetic radiation. When absorbance is present in either the reference substance or the sample, the intensity of the electro-magnetic radiation exiting the system is less than that entering the system. The terms, $A_{reference}$ and $A_{sample}$ represent the absorbance of the reference substance and sample, respectively.

As the electromagnetic radiation emitted by the tunable light source 210 passes through the reference substance 220, some of the electromagnetic radiation interacts with molecules of the reference substance 220 and is absorbed by the molecules, and some of the electro-magnetic radiation does not interact with the molecules of the reference substance 220 and passes through the reference substance 220. The electromagnetic radiation 235 which passes through the reference substance 220 then passes through the sample 230, wherein some of the electromagnetic radiation 235 interacts with molecules of the sample 230 and is absorbed by the molecules, and some of the electro-magnetic radiation does not interact with the molecules of the sample and that electro-magnetic radiation 245 passes on to the system detector 240. For this embodiment, the location of the sample 230 is after the reference substance 220. In yet another embodiment, the location of the sample 230 is located before the reference substance 220.

Absorbance is related to the electro-magnetic radiation intensity entering and exiting each element of the system by, $$A \equiv \log_{10}\left(\frac{I_{entering\ element}}{I_{exiting\ element}}\right)$$

Using the mathematical relationship between log based 10 and natural log, the intensity of electro-magnetic radiation after traveling through a reference substance can be described by, $$I_1 = I_0 e^{-A_{reference}}$$

and the intensity of electro-magnetic radiation after traveling through a sample can be described by, $$I_2 = I_1 e^{-A_{sample}}$$

Combining the two equations, the intensity of electro-magnetic radiation after traveling through a reference substance and sample can be described by:

$$I_2 = [I_0 e^{-A_{reference}}]e^{-A_{sample}} = I_0 e^{-(A_{reference}+A_{sample})} = I_0 e^{-(A_{reference}+\epsilon C_{sample} \times sample)}$$

For an embodiment, the processor 250 receives the information of the sensed electro-magnetic radiation from the detector 240 and further operates to tune the wavelength of the beam of electro-magnetic such that the tunable light source wavelength is consistent with a wavelength region at which electro-magnetic radiation is absorbed by the reference substance 220. The shape which describes the amount of absorbance as a function of wavelength or related parameter over this region is designated as the absorbance spectral feature. If the absorbance of the reference substance 220 is known, $A_{reference} = \epsilon C_{reference} x_{reference}$, and the molar extinction coefficient multiplied times the pathlength of the sample is known, $\epsilon x_{sample}$, then the amount of sample 230, $C_{sample}$, can be determined by measuring $I_2$ and $I_0$.

Figure 4:
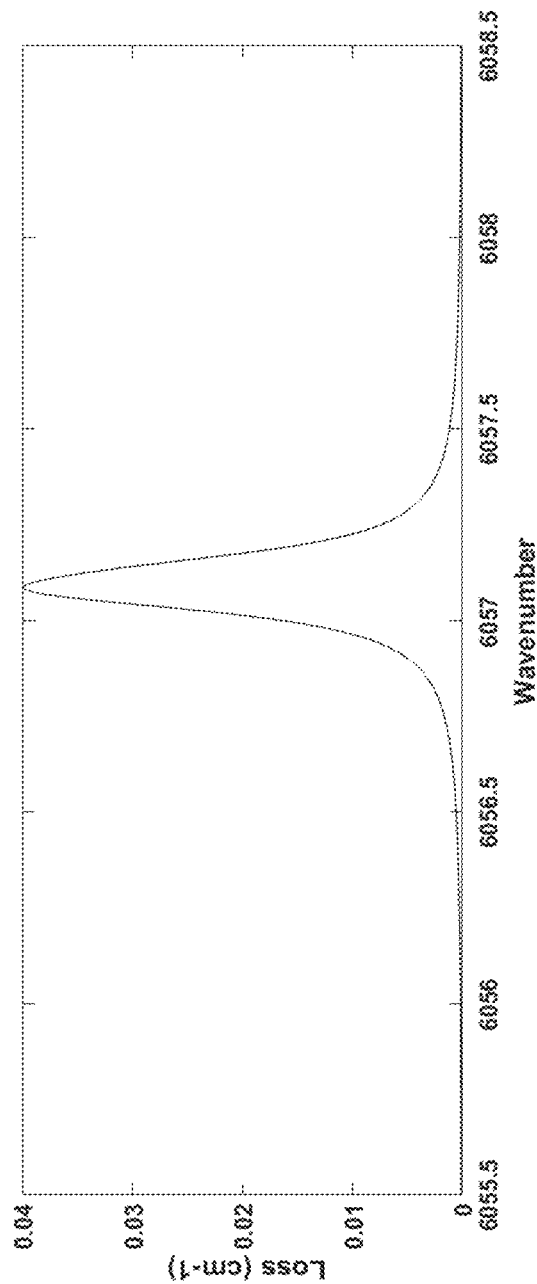
FIG. 4 shows a variation in shape of an intensity or amplitude of recorded sensed electro-magnetic radiation that is used to detect the reference substance and the sample, according to an embodiment.

FIG. 4 shows an example of a variation in shape of an intensity or amplitude of recorded sensed electro-magnetic radiation that can be used to detect the reference substance and the sample, according to an embodiment. Specifically, FIG. 4 shows an absorbance spectral feature for methane when measured at atmospheric pressure, according to an embodiment.

The shape of the absorbance spectral feature can be described by the area under the shape, the maximum shape height, as well as other shape related parameters that provide information related to the amount of sample. One example of a function that describes the shape of the absorbance spectral feature is a Gaussian, $f(\lambda)$.

FIG. 5 is a flow chart that includes steps of a method for detecting an amount of a sample based on the received information related to the intensity or amplitude of a sensed beam of electro-magnetic radiation after passing through both the sample and a reference substance, according to an embodiment. A first step 510 includes generating, by a tunable light source, a beam of electro-magnetic radiation, wherein a wavelength of the beam of electro-magnetic radiation is tuned to operate at a plurality of wavelengths. A second step 520 includes directing at least a portion of the beam to pass through the sample and a reference substance, wherein the changes in the amount of the reference substance is known over time. A third step 530 includes sensing, by a system detector, at least the portion of the beam of electro-magnetic radiation after passing through both the sample and the reference substance. A fourth step 540 includes receiving, by a processor, information related to intensity or amplitudes of the sensed beam of electro-magnetic radiation after passing through both the sample and the reference substance. A fifth step 550 includes detecting, by the processor, an amount of the sample based on the received information related to the intensity or amplitudes of the sensed beam of the electro-magnetic radiation after passing through both the sample and the reference substance. For an embodiment, the processor operates to fit the received information to a function, such as a Gaussian, $f(\lambda)$, that describes the shape of the absorbance spectral feature.

For an embodiment changes in an amount of the reference substance are known over time. For various embodiments, the amount of reference substance can be determined using a variety of methods. One such method is to simply remove the reference substance and measure the amount of reference substance present. Another is to remove the sample so only the reference substance remains. Measuring the intensity of electro-magnetic radiation before and after traveling through the reference substance provides its absorbance.

$$I_1 = I_0 e^{-A_{reference}}$$

If the absorbance of the reference substance is known, $A_{reference} = \epsilon C_{reference} x_{reference}$, and the molar extinction coefficient multiplied times the pathlength of the reference is known, $\epsilon x_{reference}$, then the amount of reference substance, $C_{reference}$, can be determined.

Figure 6A:
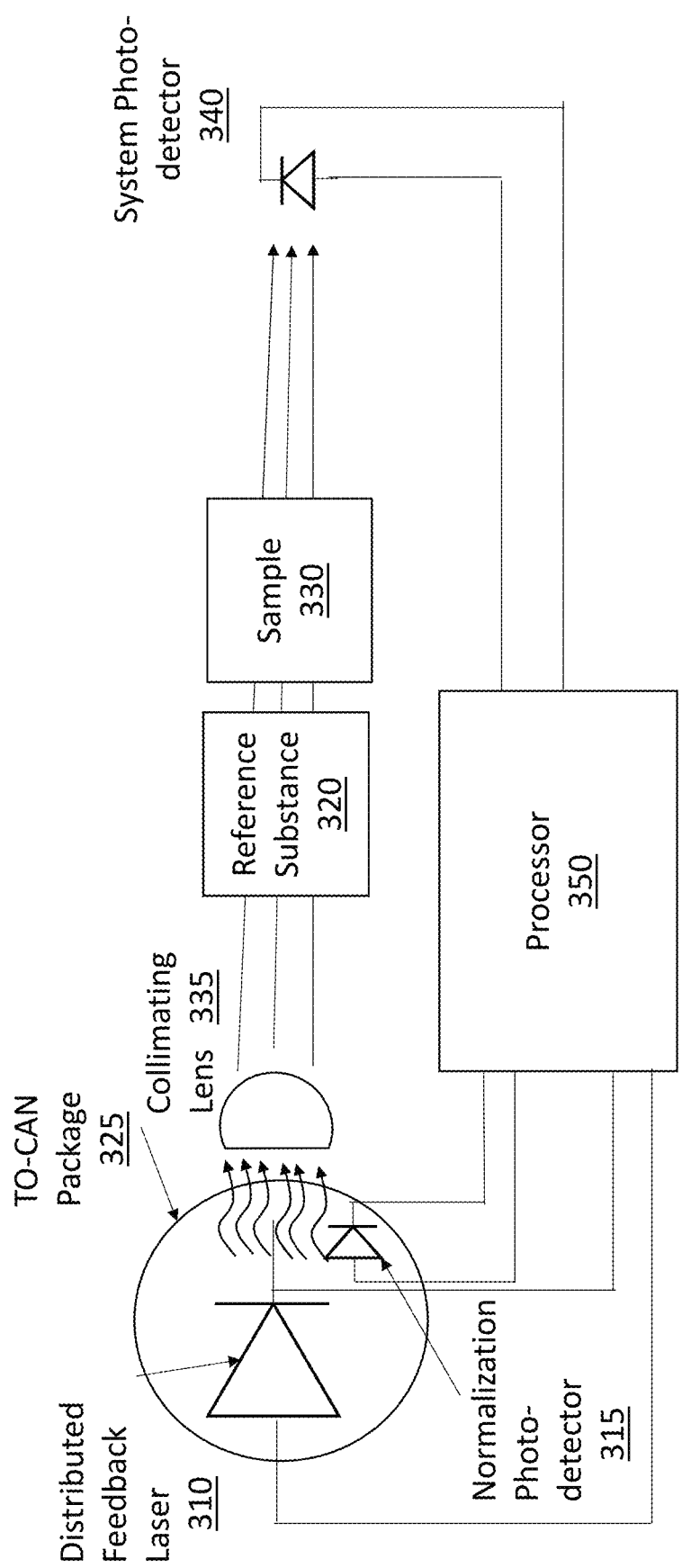
FIG. 6A is a block diagram of a system for detecting a sample that includes a distributed feedback laser and normalization detector installed in common packaging, according to an embodiment.

FIG. 6A is a block diagram of a system for detecting a sample 330 that includes a distributed feedback laser 310 and a normalization detector 315 installed in common packaging-325, according to an embodiment. The embodiment of FIG. 6A further includes a collimating lens 335, a reference substance 320, a system photo-detector 340, and a processor 350. For an embodiment, a beam of electromagnetic radiation is generated using the distributed feedback laser 310 installed in laser packaging such as a TO-CAN. The radiation emitted by the distributed feedback laser 310 is focused using the collimating lens 335 into a beam of electromagnetic radiation that then passes through the reference substance 320 and sample 330. For an embodiment, the system photodiode detector 340 senses the beam of electro-magnetic radiation after passing through the reference substance 320 and sample 330. The processor 350 receives the information of the sensed electro-magnetic radiation from the system photo-detector 340 and further operates to tune the wavelength of the beam of electro-magnetic radiation by adjusting a laser ramp offset voltage. For an embodiment, the average laser ramp voltage corresponds to a wavelength consistent with the absorbance wavelength of the substance (sample 330) of interest. This ensures that the laser remains centered at the wavelength of the absorbance spectral feature and as such centered on the absorbance of the substance of interest. The processor 350 detects the substance (sample 330) based on a variation in a shape of an intensity or an amplitude of the sensed electromagnetic radiation received from the photo-detector 340 when tuning the wavelength of the beam of electro-magnetic radiation consistence with the absorbance spectral feature wavelength of the reference substance (sample 330). The variation in the shape of an intensity or an amplitude of the sensed electro-magnetic radiation is caused by changes in optical loss due to changes in the amount of sample 330 which enables detection of the sample 330. For an embodiment, the normalization detector 315 is a photodiode operative to sense electro-magnetic radiation emitted by the distributed feedback laser 310 and is installed in the same package as the laser-325. The processor 350 further operates to account for changes in intensity or amplitudes of the beam of electro-magnetic radiation passing through the reference substance 320 and the sample 330 caused by changes in an intensity or amplitude of the electro-magnetic radiation generated by the distributed feedback laser 310.

For an embodiment, the sample 330 can be open air.

For an embodiment, the sample 330 is contained in an enclosure, wherein the enclosure has two windows optically transparent at the frequency at which an absorption of the sample 330 is measured. The use of a sample enclosure may be needed because further processing of room air samples may be desirable. For example, the removal of dust or other unwanted materials from the sample 330.

For various embodiments, the reference substance 320 can be in the form of a solid, liquid, or gas. For an embodiment, the reference substance 320 is selected to ensure that the frequency of the beam of electro-magnetic radiation generated by the laser corresponds to a frequency at which an absorption of the sample 330 is measured.

For an embodiment, the changes in the amount of the reference substance 320 is known over time and the reference substance 320 is contained in an enclosure with two windows optically transparent at the frequency at which an absorption of the sample 330 is measured. The beam of electro-magnetic radiation is directed to pass through both reference substance windows of the enclosure.

For an embodiment, wherein the changes in the amount of the reference substance 320 is known over time and the reference substance 320 is contained in a thin film in which the beam of electro-magnetic radiation is directed to pass through.

Figure 6B:
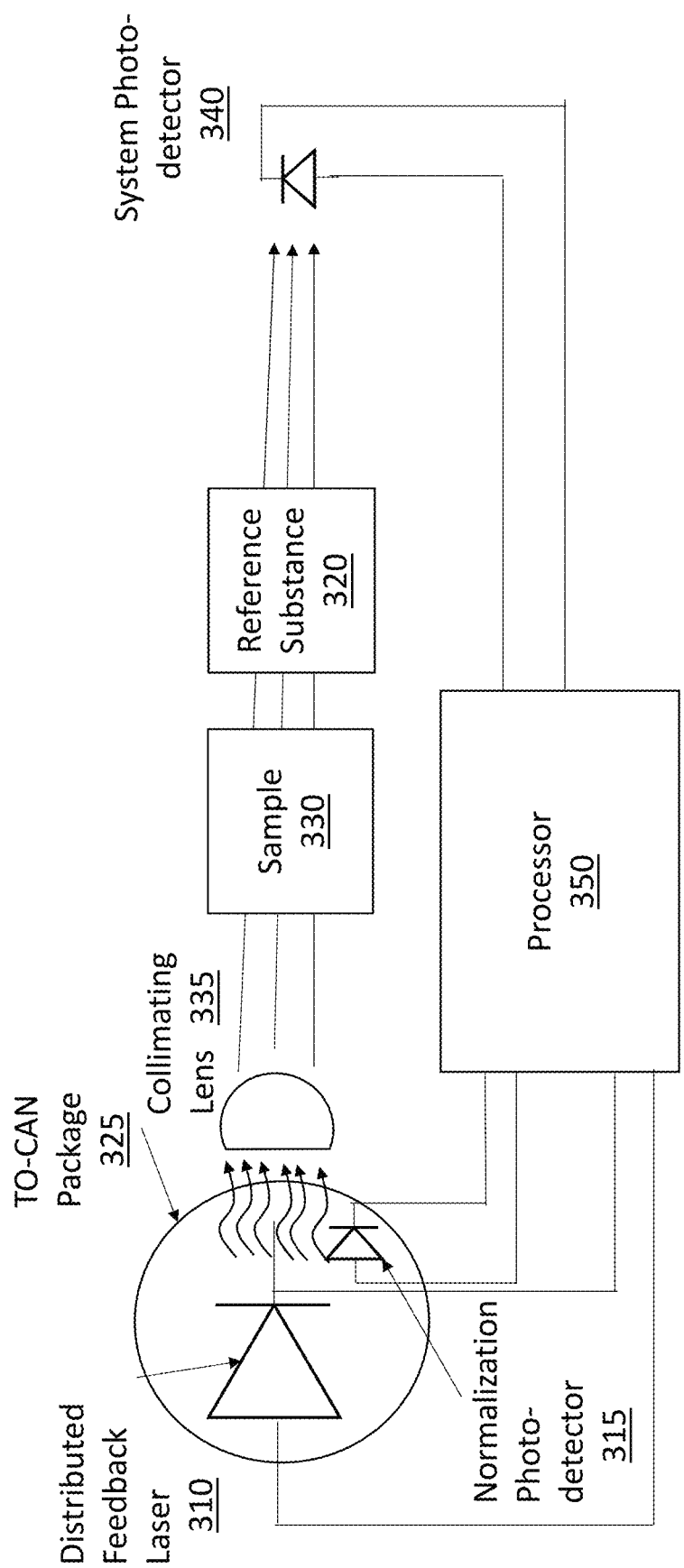
FIG. 6B is a block diagram of a system for detecting a sample that includes a distributed feedback laser and normalization detector installed in common packaging, according to another embodiment.

FIG. 6B is a block diagram of a system for detecting a sample 330 that includes a distributed feedback laser 310 and normalization detector 315 installed in common packaging 325, according to another embodiment. This embodiment illustrates that the orientation of the reference substance 320 and the sample 330 can be such that the electro-magnetic radiation may be directed to pass through the sample 330 first and then the reference substance 320. In contrast, FIG. 6A illustrates that the orientation of the reference substance 320 and the sample 330 can be such that the electro-magnetic radiation may be directed to pass through the reference substance 320 first and then the sample 330.

Figure 7:
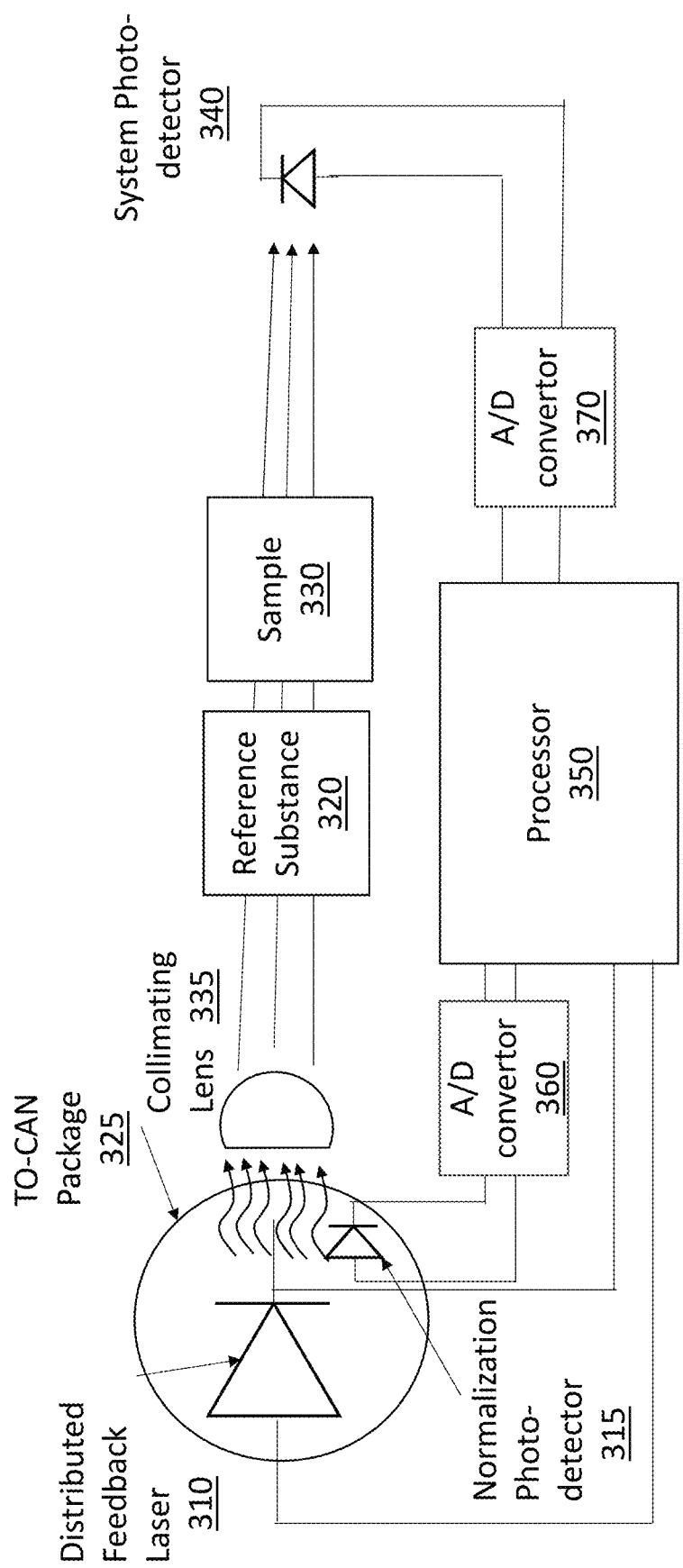
FIG. 7 is a block diagram of a system that includes an analog to digital converter associated with the system detector and an analog to digital converter associated with the normalization detector, according to an embodiment.

FIG. 7 is a block diagram of a system that includes an analog to digital converter 370 associated with the system detector 340 and an analog to digital converter 360 associated with the normalization detector 315, according to an embodiment. For at least some embodiments, the system detector 340 generates data (sensed) in an analog form. For at least some embodiments, the input into and processing by the processor 350 are digitally represented signals. For an embodiment, the analog data generated by the system detector 340 is converted into digital form by an ADC (analog to digital converter) 370. Further, the analog to digital converter 360 converts an analog signal generated by the normalization detector 315 to a digital representation that is provided to the processor 350. The processor 350 records the received output at the plurality of wavelengths and detects the sample 330.

An embodiment further includes recording the received information relating to the sensed beam of electro-magnetic radiation after passing through both the sample and the reference substance.

An embodiment further includes recording the amount of the sample based on the received sensed beam of electro-magnetic radiation after passing through both the sample and reference substance.

An embodiment further includes tuning the wavelength of the beam of electro-magnetic radiation based on monitoring electromagnetic radiation exiting from both the sample and the reference substance, wherein the reference substance is selected to ensure that a frequency of the electro-magnetic radiation corresponds to a frequency at which an absorption of the sample is measured.

An embodiment further include sensing, by a normalization detector, at least the portion of the beam of electro-magnetic radiation before passing through the sample and the reference substance, wherein the processor receives information relating to the sensed beam of electro-magnetic radiation before passing through the sample and the reference substance, and wherein the processor further records the sensed beam of electro-magnetic radiation before passing through the sample and the reference substance. An embodiment further includes accounting, by the processor, for changes in intensity or amplitude of the beam of electro-magnetic radiation after passing through the sample and the reference substance caused by changes in the intensity or amplitude of the beam of electro-magnetic radiation generated by the tunable light source.

An embodiment further includes tuning, by the processor, the beam of electro-magnetic radiation over the plurality of wavelengths one or multiple times and recording the sensed electro-magnetic radiation at the plurality of wavelengths. For an embodiment, the processor tunes the beam of electro-magnetic radiation by controlling a laser current, wherein wavelengths of the laser are consistent with absorbance spectral feature wavelengths of the reference substance and sample. For an embodiment, the processor tunes the beam of electro-magnetic radiation by controlling a temperature of the laser, wherein laser wavelengths are consistent with absorbance spectral feature wavelengths of the reference substance and sample.

An embodiment further includes detecting, by the processor, the sample and the reference substance based on a variation in a shape of the intensity or amplitude of the recorded sensed electro-magnetic radiation resulting from the at least the portion of the beam having passed through the sample and the reference substance. An embodiment further includes detecting an amount of the sample based on the recorded sensed electro-magnetic radiation. For an embodiment, the variation in the shape of the intensity or amplitude of the recorded sensed electro-magnetic radiation is used for the detection.

For an embodiment, detecting the amount of the sample is accomplished by the processor tuning the wavelength of the beam of electro-magnetic radiation by varying the laser current linearly with time such that the laser wavelengths cover the wavelength region of the maximum of an absorbance spectral feature of the reference substance and sample. For an embodiment, the laser current and beams of electro-magnetic radiation sensed by the detector and the normalization detector are recorded and analyzed by the processor.

For an embodiment, the processor fits the sensed detector radiation as a function of laser current to a function that describes the shape of the absorbance spectral feature such as a Gaussian, f(λ). Further, for an embodiment, the processor accounts for changes in intensity or amplitude of the sensed detector radiation caused by changes in the intensity or amplitude of the beam of electro-magnetic radiation generated by the tunable light source (corrected sensed detector radiation). The processor fits the corrected sensed detector radiation as a function of laser current to a function that describes the shape of the absorbance spectral feature such as a Gaussian, f(λ).

$$f(\lambda) = ae^{\frac{-(\lambda-b)^2}{c^2}}$$

The variable λ is the wavelength of the electro-magnetic radiation, the laser current, or other variable related to the laser current. The parameter a is the height of the absorption spectral feature, b is the position of the center of the spectral feature and c the Gaussian RMS width of the spectral feature. The height of Gaussian or area under the Gaussian spectral feature can then be related to the amount of sample and reference substance using calibration standards.

Figure 8:
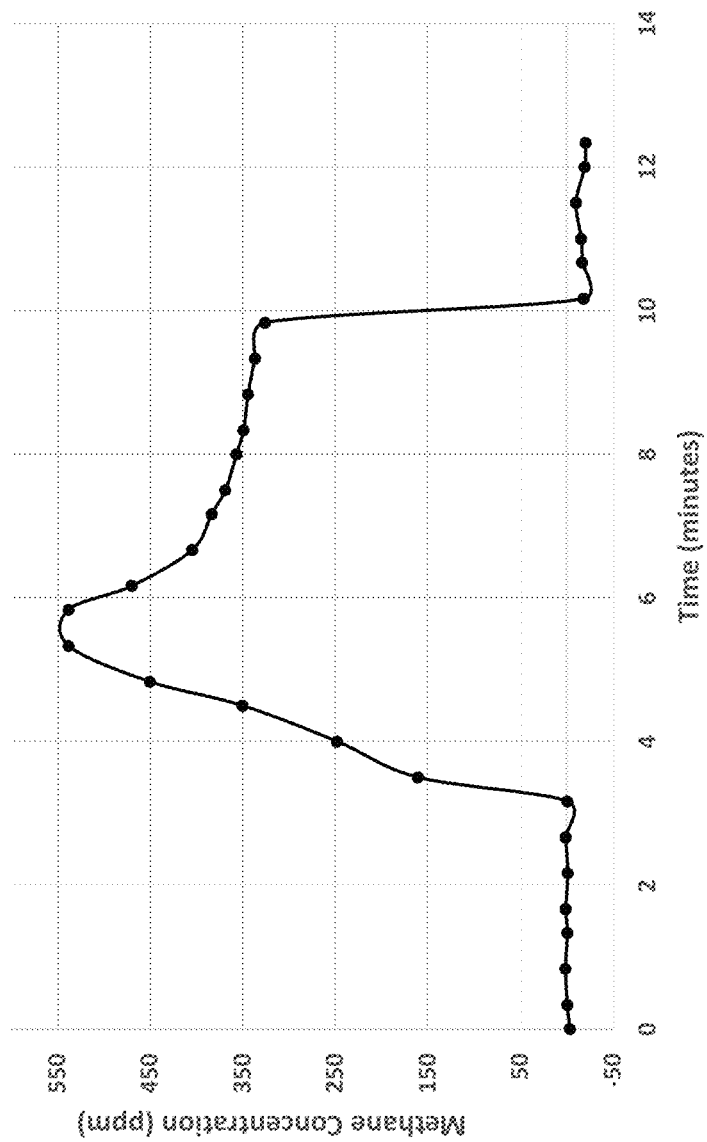
FIG. 8 shows measurements of methane concentrations, according to an embodiment.

FIG. 8 shows measurements of methane concentrations, according to an embodiment. Measurements were made about every twenty-five seconds. The start of measurements is designated as t=zero. From t=zero to three minutes, the sample chamber enclosing the measurement device contained room air (~two parts-per-million, methane). Between t~three and four minutes, methane was slowly introduced into the chamber. Between four and approximately ten minutes, the methane in the chamber slowly equilibrated. At t~10 minutes, room air was introduced back into the sample chamber. At t=12 minutes, measurements concluded.

Although specific embodiments have been described and illustrated, the embodiments are not to be limited to the specific forms or arrangements of parts so described and illustrated. The described embodiments are to only be limited by the claims.

What is claimed:

1. A system for detecting a sample, comprising:
a tunable light source, the tunable light source configured to generate a beam of electro-magnetic radiation, wherein a wavelength of the beam of electro-magnetic radiation is tuned to operate at a plurality of wavelengths, and wherein the beam of electro-magnetic radiation is directed to pass through both the sample and a reference substance;
a system detector, the system detector oriented relative to the tunable light source to enable at least a portion of the beam of electro-magnetic radiation directed to passes through both the sample and the reference substance to be received and sensed by the system detector;
the system detector configured to:
sense the at least the portion of the beam of electro-magnetic radiation that passes through the sample and the reference substance;
a processor operating to:
receive information related to intensity or amplitude of the sensed beam of electro-magnetic radiation passing through the sample and the reference substance; and
detect an amount of the sample based on the received information related to the intensity or amplitude of the sensed beam of the electro-magnetic radiation after passing through both the sample and the reference substance;
a normalization detector integrated in a common package as the tunable light source, wherein the normalization detector is located relative to the tunable light source to sense the beam of electro-magnetic radiation directed to pass through both the sample and the reference sample before passing through the sample and the reference substance;
wherein the processor further operates to:
receive information relating to the sensed beam of electro-magnetic radiation before passing through the sample and the reference substance;
record the sensed beam of electro-magnetic radiation before passing through the sample and the reference substance; and
account for changes in intensity or amplitude of the beam of electro-magnetic radiation after passing through the sample and the reference substance caused by changes in the intensity or amplitude of the beam of electro-magnetic radiation before passing through the sample and the reference substance.

2. The system of claim 1, wherein changes in an amount of the reference substance is known over time.

3. The system of claim 1, wherein the processor further operates to record the received information relating to the at least the portion of the sensed beam of electro-magnetic radiation passing through the sample and the reference substance.

4. The system of claim 1, wherein the processor operates to calculate and record the detected amount of the sample based on the sensed at least a portion of the beam of electro-magnetic radiation after passing through both the sample and reference substance.

5. The system of claim 1, wherein the processor further operates to tune the wavelength of the beam of electro-magnetic radiation based on monitoring electromagnetic radiation passing through both the sample and the reference substance, wherein the reference substance is selected to ensure that a frequency of the electro-magnetic radiation corresponds to a frequency at which an absorption of the sample is measured.

6. The system of claim 1, further comprising a collimating lens located between the tunable light source and the reference substance, the collimating lens configured to focus the beam of electro-magnetic radiation before the electro-magnetic radiation passes through the reference substance and the sample.

7. The system of claim 1, wherein the processor further operates to:
tune the beam of electro-magnetic radiation over the plurality of wavelengths one or multiple times; and
record the sensed electro-magnetic radiation at the plurality of wavelengths.

8. The system of claim 7, wherein the processor further operates to detect the amount of the sample based on a variation in a shape of an intensity or amplitude of the recorded sensed electro-magnetic radiation resulting from the at least the portion of the beam having passed through the sample and the reference substance.

9. A method of detecting a sample, comprising:
generating, by a tunable light source, a beam of electro-magnetic radiation, wherein a wavelength of the beam of electro-magnetic radiation is tuned to operate at a plurality of wavelengths;
directing, by the tunable light sensor, at least a portion of the beam to pass through the sample and a references substance;
sensing, by a system detector oriented relative to the tunable light source to receive and sense the at least the portion of the beam of electro-magnetic radiation, the at least the portion of the beam of electro-magnetic radiation passing through both the sample and the reference substance;
receiving, by a processor, information related to intensity or amplitude of the sensed beam of electro-magnetic radiation passing through both the sample and the reference substance; and
detecting, by the processor, an amount of the sample based on the received information related to the intensity or amplitude of the sensed beam of the electro-magnetic radiation after passing through both the sample and the reference substance;
sensing, by a normalization detector integrated into a common package as the tunable light source, the beam of electro-magnetic radiation before passing through the sample and the reference substance;
receiving, by the processor, information relating to the sensed beam of electro-magnetic radiation before passing through the sample and the reference substance;
recording, by the processor, the sensed beam of electro-magnetic radiation before passing through the sample and the reference substance; and
accounting, by the processor, for changes in intensity or amplitude of the beam of electro-magnetic radiation after passing through the sample and the reference substance caused by changes in the intensity or amplitude of the beam of electro-magnetic radiation before passing through the sample and the reference substance.

10. The method of claim 9, wherein changes in an amount of the reference substance is known over time.

11. The method of claim 9, further comprising recording the received information relating to the sensed beam of electro-magnetic radiation after passing through both the sample and the reference substance.

12. The method of claim 9, further comprising recording the amount of the sample based on the known amount of the reference substance and the received sensed beam of electro-magnetic radiation passing through both the sample and reference substance.

13. The method of claim 9, further comprising tuning the wavelength of the beam of electro-magnetic radiation based on monitoring electromagnetic radiation exiting from both the sample and the reference substance, wherein the reference substance is selected to ensure that a frequency of the electro-magnetic radiation corresponds to a frequency at which an absorption of the sample is measured.

14. The method of claim 9, further comprising focusing, by a collimating lens located between the tunable light source and the reference substance, the beam of electro-magnetic radiation before the electro-magnetic radiation passes through the reference substance and the sample.

15. The method of claim 9, further comprising:
tuning, by the processor, the beam of electro-magnetic radiation over the plurality of wavelengths one or multiple times; and
recording the sensed electro-magnetic radiation at the plurality of wavelengths.

16. The method of claim 15, further comprising, detecting, by the processor, the amount of the sample based on a variation in a shape of an intensity or amplitude of the recorded sensed electro-magnetic radiation resulting from the at least the portion of the beam having passed through the sample and the reference substance.

* * * * *